US007957832B2

(12) United States Patent
Testa

(10) Patent No.: US 7,957,832 B2
(45) Date of Patent: Jun. 7, 2011

(54) METHOD AND SYSTEM FOR VIBRATION AVOIDANCE FOR AUTOMATED MACHINERY

(75) Inventor: Francis Joseph Testa, Fairport, NY (US)

(73) Assignee: Teknic, Inc., Pittsford, NY (US)

( * ) Notice: Subject to any disclaimer, the term of this patent is extended or adjusted under 35 U.S.C. 154(b) by 311 days.

(21) Appl. No.: 12/410,818

(22) Filed: Mar. 25, 2009
(Under 37 CFR 1.47)

(65) Prior Publication Data
US 2009/0204236 A1  Aug. 13, 2009

Related U.S. Application Data

(62) Division of application No. 11/744,425, filed on May 4, 2007, now Pat. No. 7,613,540.

(51) Int. Cl.
*G06F 19/00* (2006.01)
*G05B 19/25* (2006.01)
*G01N 24/00* (2006.01)
*G05B 21/00* (2006.01)

(52) U.S. Cl. ........ 700/187; 700/186; 700/188; 700/189; 700/280; 318/570; 318/573; 73/570

(58) Field of Classification Search .......... 700/186–189, 700/280; 318/570, 573; 73/570
See application file for complete search history.

(56) References Cited

U.S. PATENT DOCUMENTS

| 4,195,265 | A |   | 3/1980 | Vali |
|---|---|---|---|---|
| 4,916,635 | A |   | 4/1990 | Singer et al. |
| 5,627,440 | A | * | 5/1997 | Yamamoto et al. ...... 318/568.21 |
| 5,638,267 | A |   | 6/1997 | Singhose et al. |
| 5,646,350 | A | * | 7/1997 | Robinson et al. ............... 73/602 |
| 5,920,679 | A | * | 7/1999 | Ge et al. ......................... 700/262 |
| 5,929,700 | A |   | 7/1999 | Fuller et al. |
| 5,943,634 | A | * | 8/1999 | Piety et al. ..................... 702/56 |
| 5,955,856 | A | * | 9/1999 | Sato et al. ..................... 318/560 |

(Continued)

OTHER PUBLICATIONS

Schmidt, P. and Rehm, T. "Notch filter tuning for resonant frequency reduction in dual inertia systems" Industry Applications Conference, 1999. Thirty-Fourth IAS Annual Meeting. Conference Record of the 1999 IEEE vol. 3, Date: 1999, pp. 1730-1734.
Kollmorgan ServoExpert. Action Use a Notch Filter—Danahar Motion. http://www.danahermotion.com/support/troubleshooting/investigate/ActNotch.php. 2000.

(Continued)

*Primary Examiner* — Ronald D Hartman, Jr.
(74) *Attorney, Agent, or Firm* — Brown & Michaels, PC

(57) ABSTRACT

A method for vibration avoidance in automated machinery produces actuator space-time contours that meet design objectives of the machinery while suppressing energy content at frequencies in the space-time contour, by concatenating multiple space-time contour segments together in such a way as to be mostly free of energy at the frequencies of interest while meeting other specified design goals. The segments used to construct these frequency-optimized-contours are a series of concatenated polynomial segments, the independent variable t being time. These segments can define the variable to be controlled (e.g. speed or distance) versus time, or define one of the controlled variable's time-derivatives (e.g., the slope of the speed vs. time, etc.). When these frequency-optimized-contours are fed as a command to a machine controller through an actuator or actuators, the energy at the frequencies of interest is low enough to avoid deleterious vibration from occurring while still meeting the machine performance objectives.

8 Claims, 8 Drawing Sheets

U.S. PATENT DOCUMENTS

| | | | | |
|---|---|---|---|---|
| 6,244,887 | B1* | 6/2001 | Commerci et al. | 439/284 |
| 6,552,507 | B2* | 4/2003 | Miyazawa | 318/568.11 |
| 6,920,378 | B2* | 7/2005 | Eloundou et al. | 700/280 |
| 7,031,096 | B2 | 4/2006 | Kisaka | |
| 7,148,636 | B2* | 12/2006 | Ueda et al. | 318/114 |
| 7,519,480 | B2* | 4/2009 | German | 702/41 |
| 2002/0099475 | A1* | 7/2002 | Spangler et al. | 700/280 |
| 2008/0300726 | A1* | 12/2008 | Heiland | 700/280 |

OTHER PUBLICATIONS

Convolve, Inc. Brochure, http://www.convolve.com/Convolve%20Brochure.PDF, 2000.

Galil Motion Control, Inc. Application Note 2431, http://www.galilmc.com/support/appnotes/optima/note2431.pdf.

International Search Report and Written Opinion dated Oct. 8, 2008 for PCT/US2008/062419.

* cited by examiner

METHOD AND SYSTEM FOR VIBRATION AVOIDANCE FOR AUTOMATED MACHINERY

This is a divisional patent application of co-pending U.S. application Ser. No. 11/744,425, filed May 4, 2007, entitled "METHOD AND SYSTEM FOR VIBRATION AVOIDANCE FOR AUTOMATED MACHINERY" The aforementioned application is hereby incorporated herein by reference.

BACKGROUND OF THE INVENTION

1. Field of the Invention

The invention pertains generally to the field of methods for minimizing unwanted system dynamics. More particularly, the invention pertains to a method and system for vibration avoidance for use with automated machinery.

2. Description of Related Art

Automated machines often have performance limitations caused by the vibration within the mechanisms and the stationary structure to which these mechanisms are attached within the machinery. Often, no matter how much energy is applied to a mechanism it is unable to perform the assigned task faster than a certain rate because vibrations interfere with the successful completion of the task. In these machines, although the application of more energy typically allows the mechanism to operate faster, the increased energy causes the amplitude of the vibrations to increase. The increased vibrations interfere with the machine's operation, especially the timely and precise stopping of an apparatus at a target point or value.

In the past, these problems have been dealt with using engineering methods, e.g., carefully designing the machine elements to not vibrate by using special materials, increasing the mass and/or stiffness of the frame and carefully designing the overall structure of the apparatus to avoid vibration, etc. These methods can only solve the problem to a limited degree, tend to increase the assembled cost of the machine, and require additional design effort and engineering cost to implement. Sometimes the successful application of these mechanical solutions is not possible because of constraints imposed by the very task the machine is attempting to perform.

Every contour that machine elements are asked to follow as a function of time is referred to herein as a space-time contour where "space" is the dependent physical variable to be controlled (i.e., space variable) as a function of the independent variable time. Typical physical variables to be controlled might be the height of a car, the pressure of a vessel, temperature of a slab, speed of a rotating disk, angle of an arm, etc. The physical variable to be controlled is "forced" by an actuator that might be a hydraulic piston, pump, burner, etc.

To understand the problem more fully, one has to be aware that every space-time contour contains energy at multiple frequencies, and one can transform space-time contours into a function of energy versus frequency and vice versa. Typical space-time contours that machine elements are asked to follow are similar to an impulse and contain a broad spectrum of frequencies much like the impulse from a drumstick striking a surface has a broad spectrum of frequencies. If the drumstick strikes a foam pad on a board the result is a dull thud because the pad is similar to well damped machine elements without resonance so no frequencies are amplified or sustained. If the drumstick strikes a gong or a tuning fork the result is sustained vibration. Imagine then, an exaggerated example where the machine elements in a machine have a gong they are trying to move as a load, or alternately a tuning fork within a mechanical transmission. The goal then is to have the machine elements follow a space-time contour, for example, to get the gong and/or tuning fork from point A to point B while keeping the gong and/or tuning fork from vibrating at their natural frequencies (exciting frequencies). Simply put, this can be accomplished by removing the energy from the mechanical actuator that moves from point A to point B at the exciting frequencies that would excite the gong and/or the tuning fork.

In the past, control methods have been employed to remove the energy at the exciting frequencies so as to limit the vibration to help free the machine designer from vibration constraints. These control methods fall into two different classes.

The first class of control method that has been employed is to remove the frequency or frequencies that cause problematic vibration (exciting frequencies) directly from the energy source driving the mechanism (typically electrical current or hydraulic flow) through an actuator. (See, FIG. 1). This is accomplished by placing a frequency selective filter in the path of the energy source control. This method reduces the exciting frequencies entering the machine through the actuator. Feedback is usually employed from sensor(s) on a machine element(s) to modulate this power source through the filter to force the mechanism to follow its desired space-time contour. This control method has limitations in that the space-time contour command itself still likely has energy at frequencies that will cause vibration in the machine. By removing the exciting frequencies from the energy source driving the machine elements, errors are induced limiting the faithful following of the space-time contour, and often, these errors are unacceptable to the machine operation. In many instances, if the filtering of the energy source is not sufficient and/or robust, the feedback control, attempting to follow the desired space-time contour will force energy back into the system at the exciting frequencies, limiting the usefulness of this control solution.

The second class of control method that has been employed is to reduce the level of exciting frequencies that cause vibration from the space-time contour that the machine elements are to follow. (See, FIG. 2). This is accomplished by taking a space-time contour which has been designed to meet the application objectives and routing it through a frequency elimination filter that selectively removes most of the energy at the exciting frequencies to produce a "non-exciting" contour. This "non-exciting" contour is then delivered as the command to the control system that modulates the actuator driving machine elements in a machine. The contours for one or more apparatus within the machine may be filtered in this way to reduce vibrations. This method has proven to be effective to various degrees in reducing machine vibration, dependent upon the level of suppression provided by the filter and the robustness of the filter's effectiveness with changes in the machine elements. The unfortunate side effect of this technique is distortion of the "non-exciting" contour from the original desired space-time contour. In fact, specific versions of this method are often described as a method to "shape" the space-time contour. These specific methods to shape a contour are, in fact, a specialized frequency selective filter that has been designed by a specific time-domain technique, see U.S. Pat. No. 4,916,635. Space-time contour filtering produces, in any case, a contour that is distorted from the original designed space-time contour such that it usually degrades the performance of the machine, often causing it to not meet the design objectives. In the case of a space-time contour that is intended to move a mechanical load from one point to another and then stop, this method always increases the time between these points because delay, inherent in the filter operation, necessarily lengthens the "non-exciting" contour. This has the likely effect of slowing the overall machine, reducing its operating throughput.

Thus, there is a need in the industry for an improvement over these techniques to allow more freedom from constraints in the design of mechanisms within machines and/or to increase the throughput from existing mechanism designs without suffering the deleterious effects of induced vibration.

SUMMARY OF THE INVENTION

The new method described herein represents an advance over the prior art in that it produces space-time contours that meet the original design objectives while suppressing the energy content at the exciting frequencies in the space-time contour, said resulting space-time contour defined as a frequency-optimized-contour. This method also takes into account physical limitations within the machine system as a constraint such that the frequency-optimized-contour keeps one physical variable (speed, distance, force) within a bound, said bound being described herein as a limitation of a physical variable.

We have developed a machine control system that produces these frequency-optimized-contours when given the goals the space-time contours must attain (typically points in space and time) and constraints on the frequency content of the resulting space-time contour. Limits can be imposed based not only on the energy level at the exciting frequencies but the energy limit can be extended to a band about these frequencies. Using frequency bands as limits makes the technique robust should the exciting frequencies shift in the machine due to manufacturing tolerance, wear, aging, drift, etc. of the machine elements. This band (or these bands) of frequencies are defined herein as frequencies of interest which, along with their suppression criteria are specified by frequency-elimination criteria. No expressions that quantify the dynamics of the machine elements are required for this invention to operate properly, freeing the designer from tedious analysis.

Frequency-optimized-contours are produced, without any post filtering or shaping, by concatenating multiple space-time contour segments together in such a way as to be mostly free of energy at the frequencies of interest while meeting the other design goals specified for the space-time contour. The segments used to construct these frequency-optimized-contours are a series of concatenated polynomial segments as further discussed below. When these frequency-optimized-contours are fed as a command to machine controller through an actuator or actuators, the energy at the frequencies of interest is low enough to avoid deleterious vibration from occurring while still meeting the machine performance objectives.

DETAILED DESCRIPTION OF THE INVENTION

Figure 1:
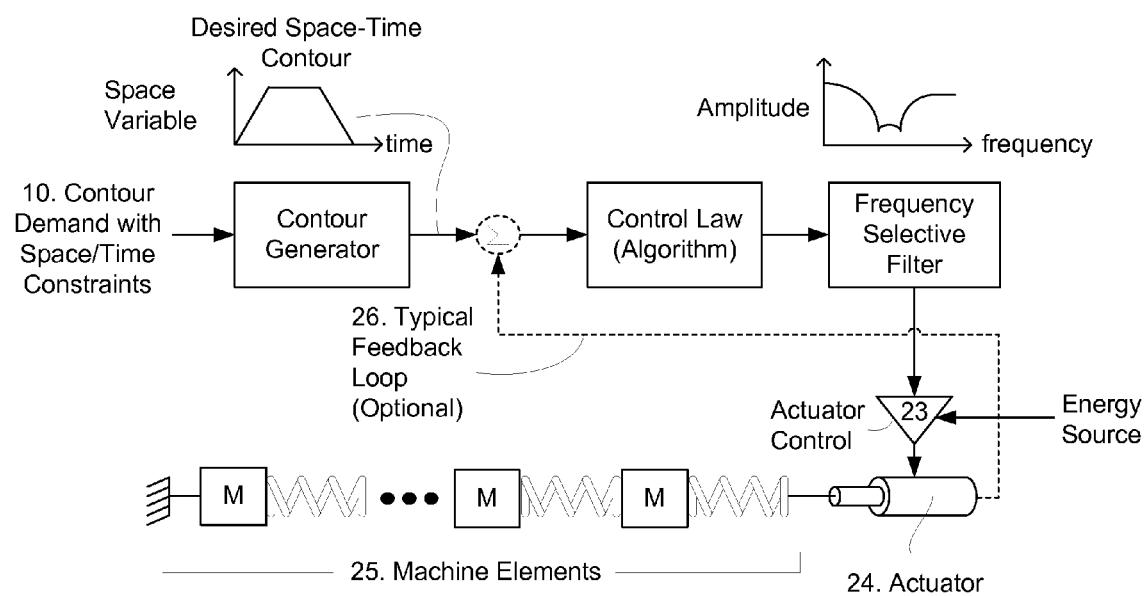
FIG. 1 provides a schematic diagram illustrating a first prior art type of control method employed to remove exciting frequencies.
Figure 2:
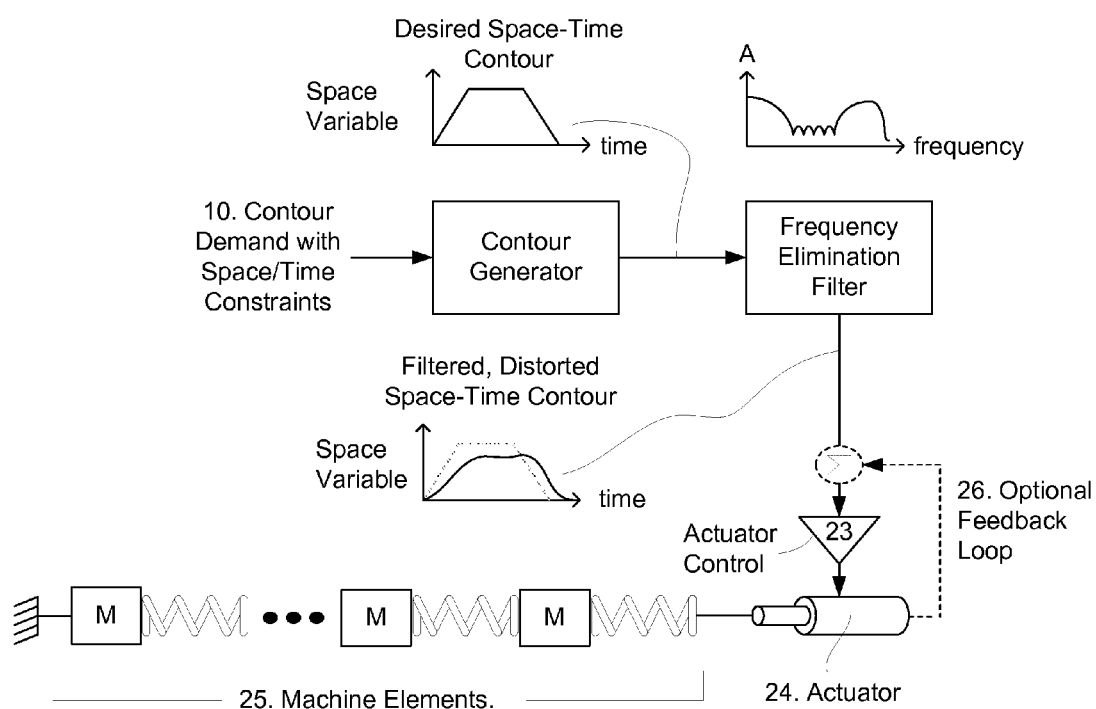
FIG. 2 provides a schematic diagram illustrating a second prior art type of control method employed to remove exciting frequencies.
Figure 3:
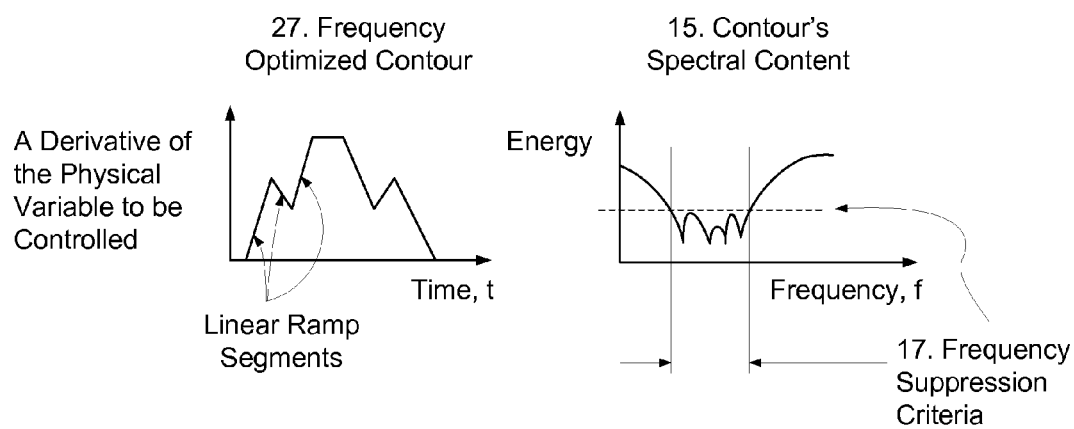
FIG. 3 provides a schematic diagram illustrating a frequency optimized contour.

As previously noted, frequency-optimized-contours are produced in our invention, without any post filtering or shaping, by concatenating multiple space-time contour segments together in such a way as to be mostly free of energy at the frequencies of interest while meeting the other design goals specified for the space-time contour. The segments used to construct these frequency-optimized-contours are a series of concatenated polynomial segments where each polynomial segment can be defined by the equation: $x=k_0+k_1t+k_2t^2+\ldots+k_nt^n$, etc. or equivalent algebraic forms, the independent variable t being time. These segments can define the variable to be controlled (e.g. speed or distance) versus time, or define one of the controlled variable's time-derivatives (e.g., the slope of the speed vs. time, etc.).

As an example, if the frequency-optimized-contour to be designed was to be a distance vs. time contour, the concatenated segments used to construct the contour could be linear ramp segments in speed vs. time ($s=k_0+k_1t$) where s, speed, is the time-derivative of distance. Examples of higher order time-derivative segments used to build a distance vs. time contour would be segments in acceleration vs. time, jerk (derivative of acceleration vs. time), etc.

When these frequency-optimized-contours are fed as a command to machine controller through an actuator or actuators, the energy at the frequencies of interest is low enough to avoid deleterious vibration from occurring while still meeting the machine performance objectives.

There are four primary methods for producing such a frequency-optimized-contour:

A. By using an optimization engine that builds a frequency-optimized-contour from polynomial segments in a time-derivative of the physical variable to be controlled, concatenated in time, and then time-integrating the segments one or more times, given the frequency-elimination criteria and space-time contour criteria on demand, when it is required for machine operation.

B. By using an optimization engine that builds a frequency-optimized-contour from polynomial segments of the physical variable to be controlled, concatenated in time, given the frequency-elimination criteria and space-time contour criteria on demand, when it is required for machine operation.

C. By a space-time contour culling method that creates a frequency-optimized-contour by selecting a frequency-optimized-contour from a previously constructed database and scaling it to meet the current demand from the machine control system. The Optimized Contour Database having been previously populated using one or more of the methods in A or B above with frequency-optimized-contours that are a suitable root set for machine operation.

D. By a space-time contour culling method that creates a frequency-optimized-contour by selecting a time-derivative frequency-optimized-contour from a previously constructed database, scaling and integrating it one or more times to create a frequency-optimized contour that meets the current demand from the machine control system. Where a time-derivative frequency-optimized-contour is a space-time contour where the dependent space variable is a time-derivative of the physical variable to be controlled, typically produced by method A above, before time-integration.

Methods C or D are typically employed when the delay in calculating a frequency-optimized-contour on-demand is too long for proper machine operation.

Figure 4:
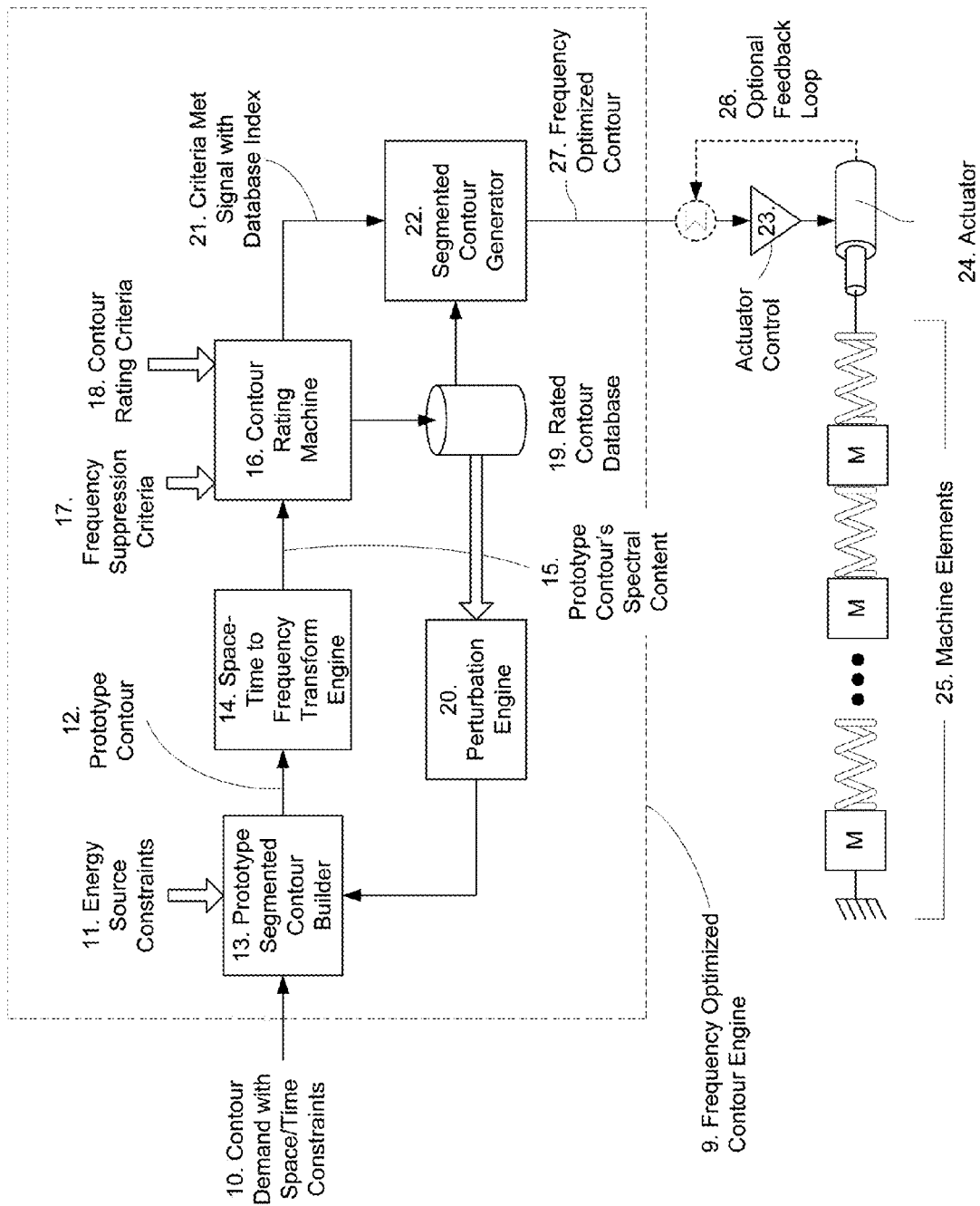
FIG. 4 provides a schematic diagram illustrating a preferred embodiment of a frequency optimized contour engine.
Figure 5:
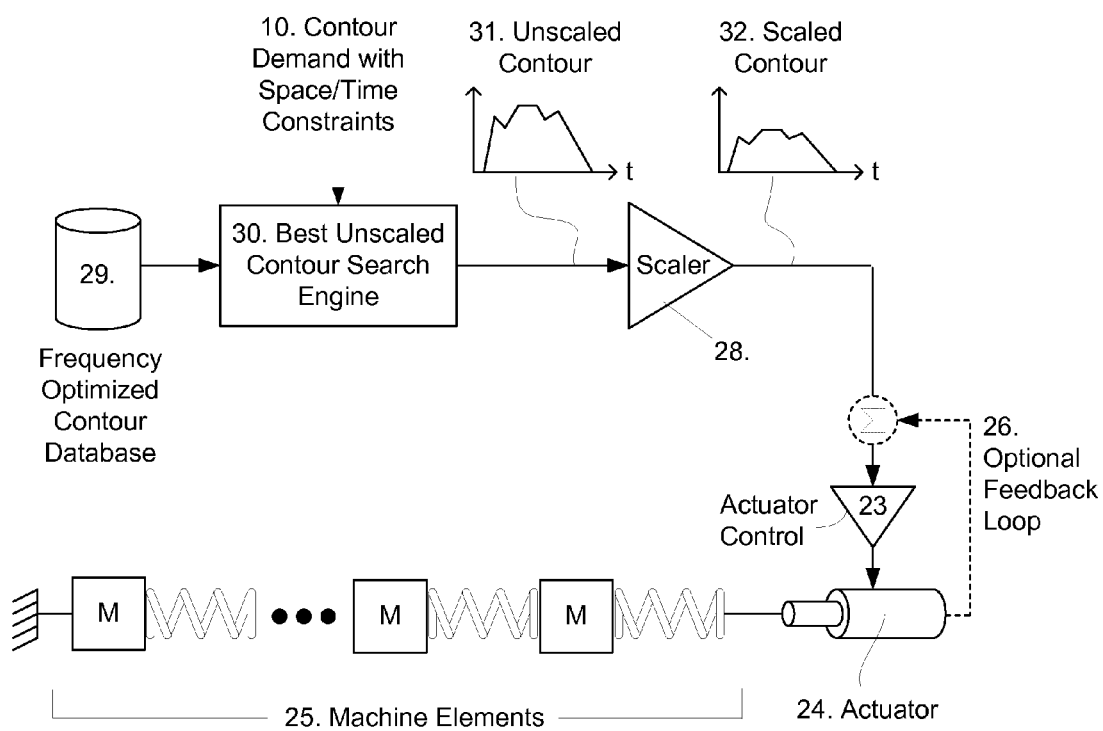
FIG. 5 provides a schematic diagram illustrating the use of a database of frequency optimized contours for a machine to be controlled for all types of contours that are expected to be required by the machine controller.

To understand how the preferred embodiment of a frequency-optimized-contour engine 9 operates, refer to FIG. 4. It can be seen that the process begins when a contour demand with space-time constraints 10 is delivered to the system. Using the actuator's capability as a constraint 11 (e.g., the maximum force vs. speed curve for the mechanical actuator 24), the prototype segmented contour builder 13 creates an arbitrary segmented space-time contour that meets the space-time constraints. This prototype contour 12 is processed by a space-time to frequency transform engine 14 to produce the prototype contour's spectral content 15 (the energy of the frequencies that are present in the prototype contour). The contour rating machine 16 then rates the prototype contour 12 against the contour rating criteria 18 and the prototype contour's spectral content 15 against the frequency-elimination criteria 17, which is the maximum level of the frequencies of interest. The contour's specification is then stored in a rated contour database 19 along with a quality rating that describes how close the contour meets the criteria 17 and 18.

The prototype segmented contour builder 13 continues to fill the rated contour database 19 with contour specifications using the above method until a sufficiently diverse initial prototype set of contours is produced (seed contours). The level of diversity (number of seed contours) that is sufficient is dependent on the method used within the perturbation engine 20 and the method used within the prototype segmented contour builder 13 and may be as small as one seed contour.

Once a sufficient diversity exists within 19 as detected by the perturbation engine 20, it takes one or more of the contour specifications therein, modifies and/or mixes it (them) to produce a specification for a new contour, which is fed to 13. At this point, the prototype segmented contour builder 13 ceases to build the seed contours and instead builds the contours requested by the perturbation engine 20 which are also analyzed by 14, rated by 16 and their specification and quality rating is stored in 19. This process continues with the perturbation engine producing prototype sets of contour specifications that are likely to contain improved contours as rated by 16 until a suitable contour is produced that meets the criteria 17 and 18 or until a time limit is reached. Once this occurs, a signal is sent to the perturbation engine 20 to stop producing contour specifications. It may stop immediately or it may continue to complete a set of contour specifications it is working on.

Once the perturbation engine 20 has ceased work, the contour rating machine 16 signals the segmented contour generator 22 that a frequency-optimized-contour 27 has been constructed and passes it the index of this contour's specification within the rated contour database 19. The segmented contour generator 22 processes the indexed specification into a full space-time contour, which is used to command the actuator control 23. The segmented contour generator 22 may perform time-integration on the series of concatenated segments, one or more times, depending on the mode of the frequency-optimized-contour engine 9. Time-integration, when used, produces the mathematical integral of the series of concatenated segments with respect to time in either a continuous or discrete time mode. As used herein, the terms time-integrated and time-integrating are verbs that are defined as performing the act of time-integration.

The actuator control 23 modulates a power source in order have the actuator 24 follow the commanded frequency-optimized-contour in a faithful manner. The actuator control 23 may or may not use a feedback loop 26 to accomplish the faithful control of the actuator 24. The machine elements 25, having been forced by the frequency-optimized-contour will vibrate at a minimum level because the vibration inducing exciting frequencies have been largely removed from the actuator output as specified by the frequency-elimination criteria 17.

It should be noted that the resulting frequency-optimized-contour produced by this method is also optimized to meet energy and space-time criteria as defined by 18. A typical space-time criteria defined by 18 would be to minimize the total elapsed time of the frequency-optimized-contour, and 18 might also include other space-time constraints, energy usage constraints, actuator loading constraints and other constraints and/or performance metrics.

If the demand for a frequency-optimized-contour must be executed faster than the frequency-optimized-contour engine can create one, an alternate supplementary machine may be used to produce similar results that can complete the task in substantially shorter time. This is accomplished by creating a database of frequency-optimized-contours for the machine to be controlled for all types of contours that are expected to be required by the machine controller. Alternately, this database can be constructed to contain a set of frequency-optimized-contours sufficiently rich such that for every contour demand that is expected to be requested by the machine controller one within the database can be selected and scaled to meet the demand requirements.

Once the database of frequency-optimized-contours is fully populated (typically done before the machine is running), then a culling apparatus is used to produce the frequency-optimized-contours quickly when demanded to do so by the machine controller. The culling machine, upon being requested for a frequency-optimized-contour by the machine controller, searches the database for the closest matching frequency-optimized-contour that can be scaled to meet the machine controller's request. To scale this contour, a scaling machine, within the culling apparatus, multiplies the dependent variable (e.g., speed, acceleration, jerk, pressure, etc.) of the contour by a constant equally at all points in time to stretch or shrink the resulting contour to meet the machine controller's request. Alternately, the scaling machine can proportionally shrink or stretch the frequency-optimized-contour in time (making the elapsed time of the contour longer or shorter). The latter has the effect of scaling the frequencies that are suppressed.

Detailed Explanation of the Method

Figure 6:
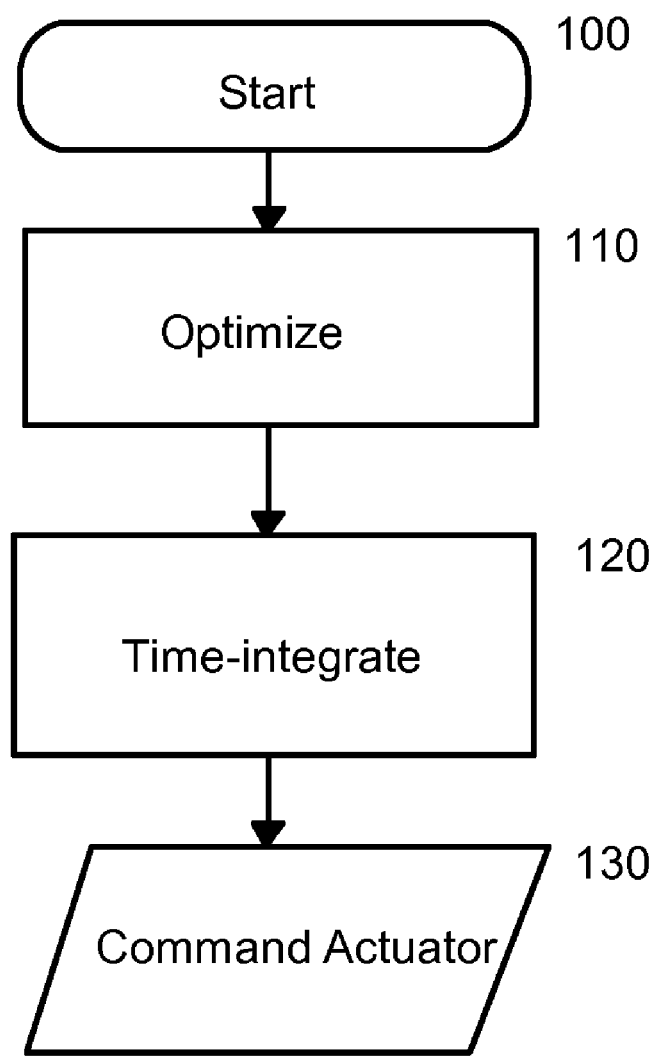
FIG. 6 provides a flowchart of a first embodiment of the method of the invention.

Referring to the flowchart in FIG. 6, an embodiment of the method of producing a space-time contour of the invention comprises:

Step 100—starting with a series of concatenated polynomial segments that are functions of time where their dependent variable is a time-derivative of at least the first order of a physical variable to be controlled, each polynomial segment comprising a duration and at least one coefficient;

Step 110—optimizing the durations and coefficients of the series of concatenated polynomial segments, such that the following constraints are met: energy that would be introduced into at least one machine element by an actuator following a space-time contour created by time-integrating the series of concatenated polynomial segments, is suppressed for at least one frequency, and a space-time contour created by time-integrating the series of concatenated polynomial segments, is constrained within at least one limitation of the physical variable.

Optionally, the optimization of step 110 could also include other constraints, such as a space-time contour created by time-integrating the series of concatenated polynomial segments will be at one or more points in a controlled variable space at selected points in time, or the sum of durations of the concatenated segments of the series of concatenated polynomial segments is minimized, or energy dissipated by the at least one actuator following a space-time contour created by time-integrating the series of concatenated polynomial segments is minimized, or other constraints as might be required by the application. During optimization, segments could be added or deleted from the series.

Step 120—time-integrating, at least once, the series of concatenated polynomial segments to form a space-time contour in the physical variable to be controlled;

Step 130—commanding an actuator to follow the space-time contour.

It will be recognized that this method can also be performed if the dependent variable of each segment is a physical variable to be controlled, and each polynomial segment comprises a duration and a coefficient, forming a space-time contour in the physical variable. In that case, the integration step 120 would not be required.

Figure 7:
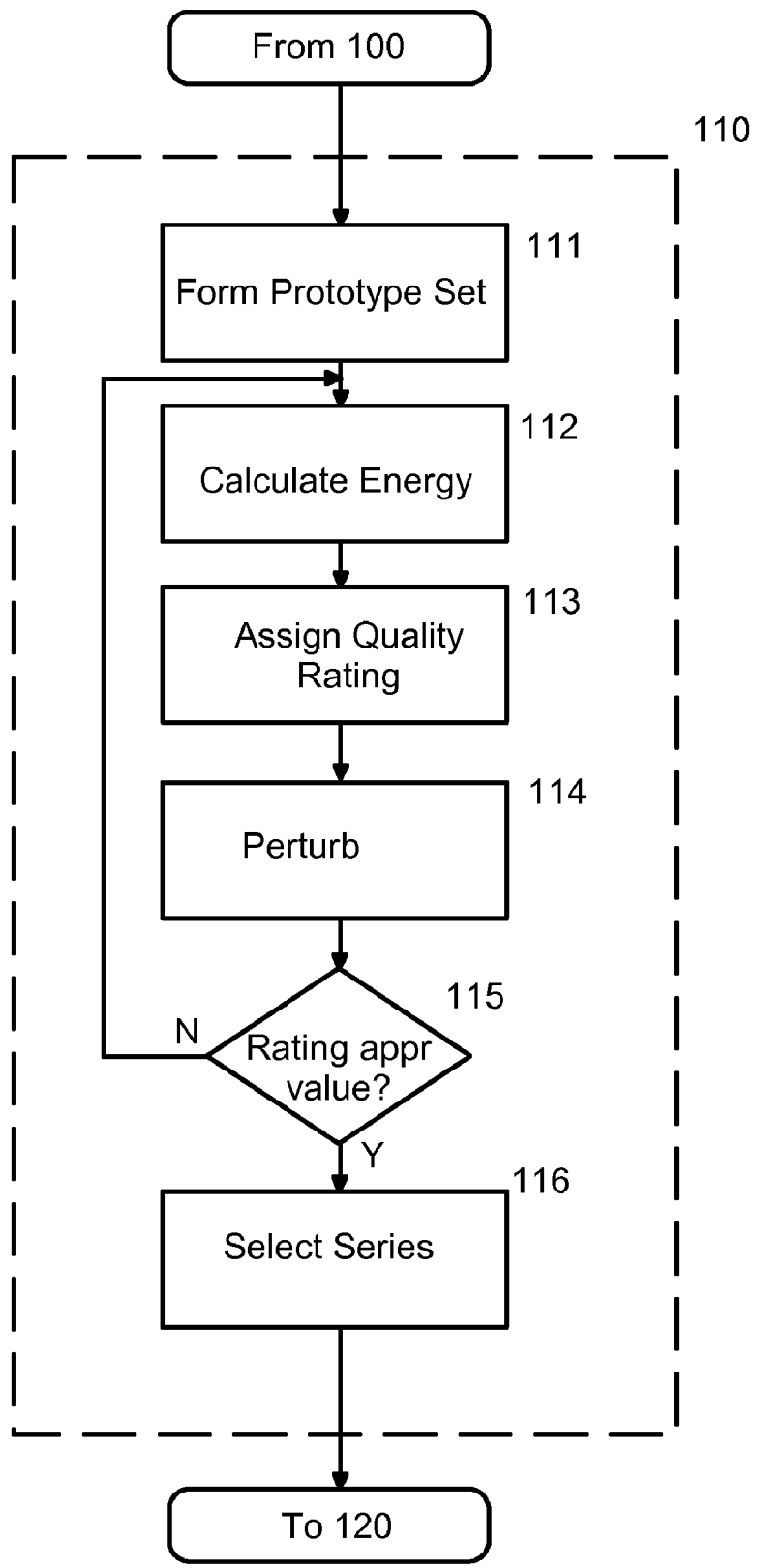
FIG. 7 provides a detail flowchart of an optimization step which can be used in the embodiment of the method of the invention of FIG. 6.

Referring to FIG. 7, the optimization of step 110 can utilize a search method which may comprise the steps of:

Step 111—using at least one capability of the actuator as a constraint, forming a prototype set from at least one series of concatenated polynomial segments;

Step 112—calculating for each series of concatenated polynomial segments in the prototype set, the energy at a set of frequencies that would be introduced into at least one machine element by an actuator following a space-time contour created by time-integrating each series of concatenated polynomial segments. If desired, a time-frequency transform process can be used to calculate the energy.

Step 113—assigning a quality rating to each series of concatenated polynomial segments within the prototype set using the energy calculated in step b, the quality rating being related to the suppression of energy at the at least one frequency.

This quality rating could optionally be related to the sum of durations of the concatenated segments of the series of concatenated polynomial segments, or a capability of an actuator to follow the space-time contour, or a total energy dissipated by an actuator when forcing a machine element to follow the space-time contour.

Step 114—perturbing at least one of the series of concatenated polynomial segments within the prototype set to produce a new prototype set; and Step 115—iteratively repeating steps 112, 113, and 114 until the best quality rating approaches a determined value, then Step 116—selecting the series of concatenated polynomial segments within the prototype set with the best quality rating.

Figure 8:
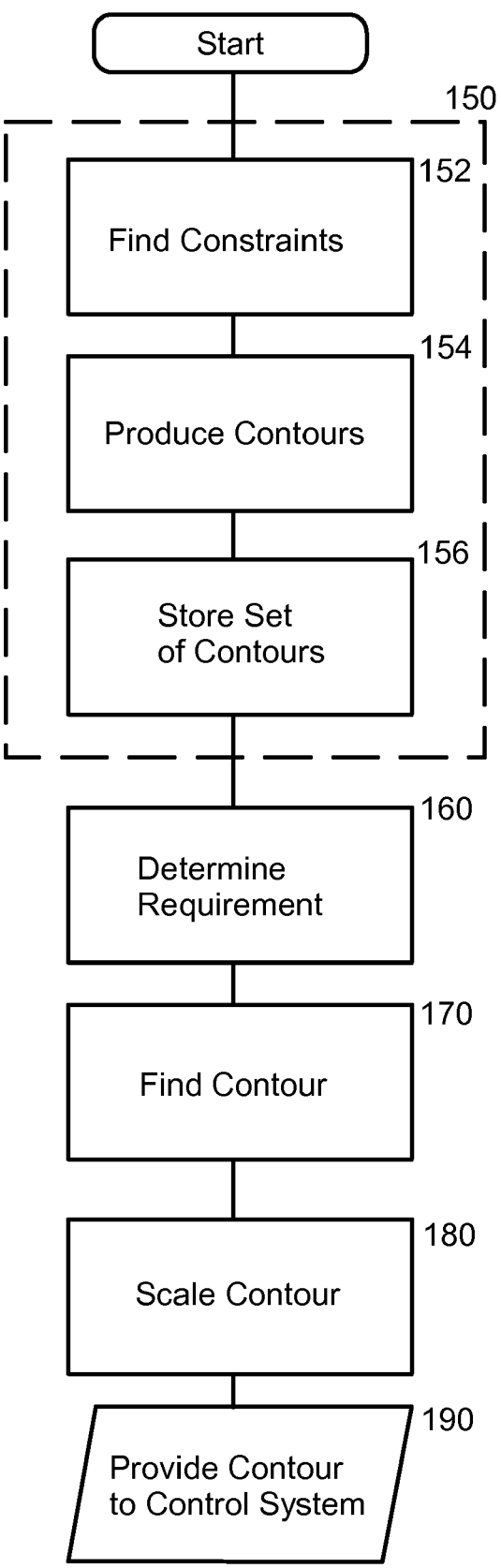
FIG. 8 provides a flowchart of a second embodiment of the invention, using a database of contours.

Referring to FIG. 8, another embodiment of the invention provides a method for providing a frequency-optimized contour to a machine control system requiring a contour comprising a physical variable to be controlled which changes with time as an independent variable during machine run time, comprising:

Step 150—creating a database of frequency-optimized contours by the steps of:

Step 152—finding a plurality of constraints for a set of contours such that, for each contour that is required during machine run time, there is at least one contour within the set that can be scaled to fit the requirement;

Step 154—producing a set of frequency-optimized-contours that meets said constraints; and Step 156—storing said set of frequency-optimized-contours in a frequency-optimized-contour database; and Step 160—determining an application requirement for a use of the machine control system;

Step 170—finding a frequency-optimized contour in the database that is suitable for amplitude scaling to meet the application requirement; and Step 180—scaling the frequency-optimized contour found in step c by multiplying a variable by a constant.

Optionally, the constant could be the number "one", in which case the variable remains the same and the scaled contour is the same as the unscaled contour. The variable could be the physical variable, and the multiplication by a constant is performed equally at all points in time to produce the scaled contour, or the variable could be the time variable, and the multiplication by a constant is performed equally throughout the contour to produce the scaled contour. The variable could, if desired, be time-integrated.

Step 190—providing the scaled frequency optimized contour to the machine control system.

However, reference herein to details of the illustrated embodiments is not intended to limit the scope of the claims, which themselves recite those features regarded as essential to the invention. Accordingly, it is to be understood that the embodiments of the invention herein described are merely illustrative of the application of the principles of the invention.

I claim:

1. A method for providing a frequency-optimized contour to a machine control system requiring a contour comprising a physical variable to be controlled which changes with time as an independent variable during machine run time, comprising:
    a) creating a database of frequency-optimized contours by the steps of:
        i) finding a plurality of constraints for a set of contours such that, for each contour that is required during machine run time, there is at least one contour within the set that can be scaled to fit the requirement;
        ii) producing a set of frequency-optimized-contours that meets said constraints; and
        iii) storing said set of frequency-optimized-contours in a frequency-optimized-contour database; and
    b) determining an application requirement for a use of the machine control system;
    c) finding a frequency-optimized contour in the database that is suitable for scaling to meet the application requirement; and
    d) scaling the frequency-optimized contour found in step c by multiplying a variable by a constant;
    e) providing the scaled frequency optimized contour to the machine control system.

2. The method of claim 1, where the constant in step d is fixed as the number one.

3. The method of claim 1, in which the variable in step d) is the time variable, and the multiplication by a constant is performed equally throughout the contour to produce the scaled contour.

4. The method of claim 1, in which the variable in step d) is the physical variable, and the multiplication by a constant is performed equally at all points in time to produce the scaled contour.

5. A method for providing frequency-optimized contours to a machine control system requiring a contour comprising a physical variable to be controlled which changes with time as an independent variable during machine run time, comprising:
   a) creating a database of frequency-optimized contours by the steps of:
      i) finding a plurality of constraints for a set of contours such that, for each contour that is required during machine run time, there is at least one contour within the set that can be scaled to fit the requirement;
      ii) producing a set of frequency-optimized-contours that meets said constraints; and
      iii) storing a time-derivative of each of the said set of frequency-optimized-contours in a frequency-optimized-contour database; and
   b) determining an application requirement for a use of the machine control system;
   c) finding a frequency-optimized contour in the database that is suitable for amplitude scaling to meet the application requirement; and
   d) producing a scaled frequency-optimized contour found in step c) by
      multiplying a variable by a constant; and
      time-integrating the variable at least once;
   e) providing the scaled frequency optimized contour to the machine control system.

6. The method of claim 5, where the constant in step d) is fixed as the number one.

7. The method of claim 5, in which the variable in step d) is the time variable, and the multiplication by a constant is performed equally throughout the contour to produce the scaled contour.

8. The method of claim 5, in which the variable in step d) is a time-derivative of at least first order of the physical variable, and the multiplication by a constant is performed equally at all points in time to produce the scaled contour.

* * * * *